Dec. 3, 1946.  J. R. BRADSHAW  2,412,121
BULK CEMENT CONVEYANCE
Filed July 30, 1945
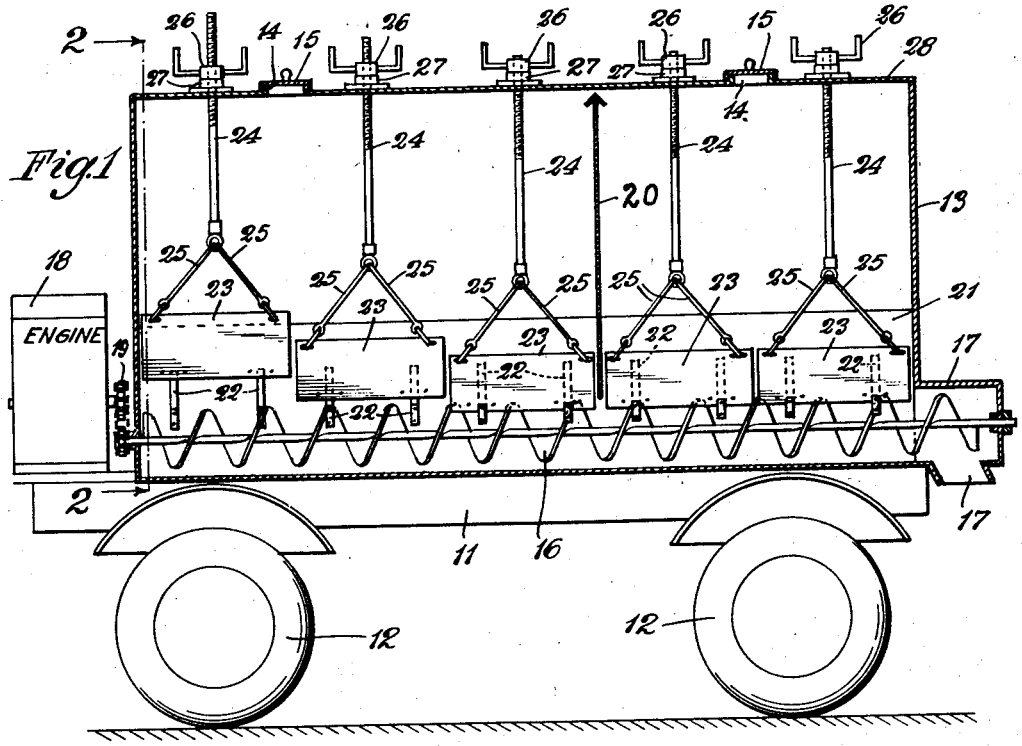
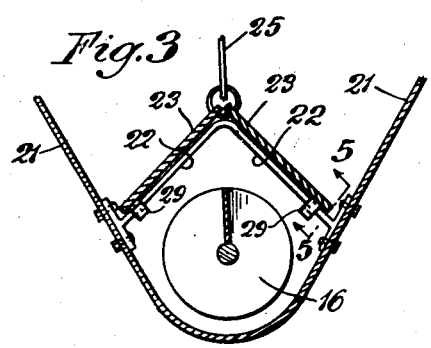
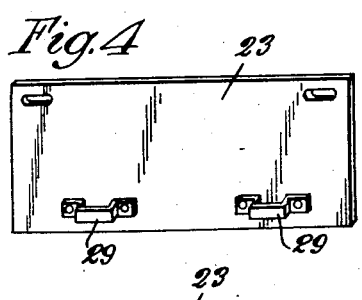
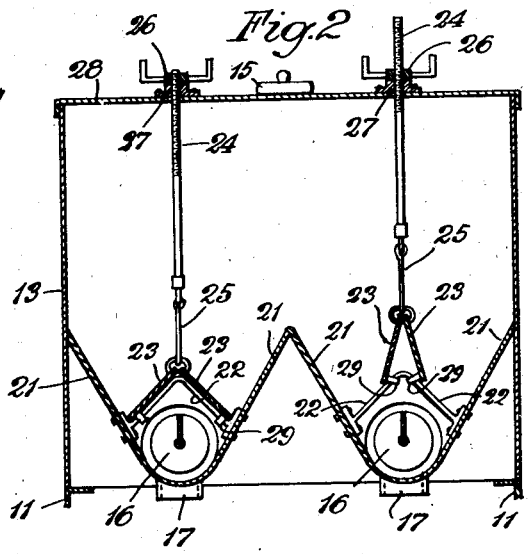
Inventor
John R. Bradshaw
by Earl Babcock
Attorney.

Patented Dec. 3, 1946

2,412,121

UNITED STATES PATENT OFFICE 2,412,121

BULK CEMENT CONVEYANCE

John R. Bradshaw, Duncan, Okla., assignor to Halliburton Oil Well Cementing Company, Duncan, Okla.

Application July 30, 1945, Serial No. 607,791

1 Claim. (Cl. 214—83)

This invention relates to automotive conveyances and more particularly to an arrangement for transporting Portland cement in bulk from one place to another, such as from a bulk storage plant to the site of an oil well.

Until a few years ago, oil wells were commonly cemented by conveying Portland cement to the well in sacks. At the well a number of men were employed to open the sacks and dump the cement into a mixer where a slurry was made and pumped into the well. Recently, bulk cement conveyances have come into use, the cement being taken to the well and fed into the mixer by means of screw conveyors located in the lower portion of the conveyance. In many cases, oil wells are located in territory where the roads are not good or in fields some distance from a central bulk cement plant, or on rough ground. As a result, Portland cement conveyed in bulk has a tendency to pack and settle. From experience it has been found that screw conveyors located in the bottom of a bulk cement conveyance cannot be rotated when the conveyance arrives at its destination because of the packing of the cement around them.

In accordance with the present invention it is proposed to equip a bulk cement conveyance having one or more discharge screws in the bottom thereof with means for preventing the packing of the cement around the screws while the cement is being transported, the protective means being so disposed as to permit it to be lifted to uncover the screws after they have started to rotate to discharge the cement from the conveyance.

Accordingly, it is an object of the invention to provide a bulk cement conveyance in which screw conveyors are employed to discharge the cement into a mixer or hopper with a minimum of inconvenience and with a minimum of power required to rotate the screw conveyors.

It is a further object of the invention to provide means for selectively dumping portions of a bulk cement conveyance so that different kinds of cement may be carried in the conveyance and discharged therefrom as desired.

Other objects reside in certain features of the arrangement and construction of parts, as will be apparent from the following description taken in connection with the accompanying drawing, in which:

Figure 1 is a vertical cross-sectional view of an automotive trailer provided with a bulk cement container, conveyor screws with an engine for driving the same and with means for preventing the bulk cement from packing around the screw conveyors, the construction being in accordance with the principles of the present invention;

Figure 2 is a transverse cross-sectional view of the container shown in Figure 1, the view being taken on the line 2—2 thereof;

Figure 3 is an enlarged cross-sectional view of one of the screw conveyors of Figure 2, with the protective means mounted thereabove;

Figure 4 is a perspective view of one of the protective plates shown in Figure 3; and Figure 5 is a cross-sectional view across the braces supporting the protective means, the view being taken on the line 5—5 of Figure 3.

Referring to the drawing in detail, it will be seen that the frame of an automotive trailer is illustrated at 11, the trailer being provided with rubber tired wheels 12. Mounted upon this trailer is a container 13, preferably of welded steel construction and provided with one or more manholes 14 through which the container 13 may be loaded with cement. The manholes may be provided with suitable covers 15.

As shown in the drawing, two screw conveyors 16 are mounted in the bottom of the container 13. These preferably extend longitudinally of the trailer body and terminate in a discharge spout or chute 17 at the rear of the trailer. A gasoline engine 18, or the like, is employed to rotate the screws 16, being connected thereto through suitable chain sprockets 19 or other driving means.

As shown in Figures 2 and 3, the lower portion of the container 13 is provided with baffle plates or guiding means 21 which form troughs in the bottom of which the screws 16 are located. In accordance with the present invention a number of inverted V-shaped braces 22 are riveted or otherwise rigidly secured to the baffle plates 21 at spaced points longitudinally along the screw conveyors 16. These serve to brace the baffle plates 21 and also serve to guide and support protective plates 23 which are placed thereon.

As shown in Figure 1, five pairs of protective plates 23 are provided. When the container 13 is being loaded with cement and while the cement is being transported the plates 23 rest upon the braces 22 in the position shown in Figure 3, and form a roof over the screw conveyors 16, thus preventing the cement from packing around the screw conveyors.

As shown at 20 in Figure 1, a transversely extending partition may be provided in the container 13. This divides the container into compartments so that cements of different kinds may be conveyed. For example the compartment to the right of the partition 20 may be loaded with cement containing 3% bentonite, while the compartment to the left of the partition may be loaded with ordinary Portland cement. By raising the sets of plates 23 selectively, the various cements may be discharged into the screws 16 and chute 17 as desired.

When the conveyance has reached its destination and it is desired to discharge the container 13, the engine 18 is started and the screw conveyors 16 rotated. The plates 23 are then raised to the position shown at the right hand side of Figure 2, so as to uncover the screws 16 and permit the cement to move downwardly into the screw conveyors 16. Any suitable means, either mechanical or hydraulic, may be employed to raise the protective plates 23. In the arrangement shown, a jack is employed, the screw 24 of which is connected to the plates 23 through suitable linkage 25. The jack includes a hand operated nut 26 swivelled upon a base member 27 mounted on the top 28 of the container 13. As shown in Figures 4 and 5, loose fitting brackets 29 are secured to the plates 23 to guide the plates over the angled braces 22.

With the arrangement just described, it will be apparent that provision has been made for preventing cement from packing around the screws while the conveyance is being moved long distances or over rough roads, but in which the cement may readily be discharged from the container when so desired.

While only one embodiment of the invention has been shown and described herein, it is obvious that various changes may be made without departing from the spirit of the invention or the scope of the annexed claim.

I claim:

In an automotive conveyance for cement in bulk, a container having a partition therein dividing the same into compartments, screw conveyors mounted for rotation in the bottom of said container for discharging cement therefrom, baffle plates forming troughs for directing the cement into said screw conveyors, angled braces disposed above said screw conveyors at spaced points therealong and connected to said baffle plates, protective plates mounted in pairs for sliding movement on said angled braces and adapted to form roofs over said screw conveyors, and jacks mounted on the top of said container for raising said protective plates selectively to permit cement from either of said compartments to flow into said screw conveyors as desired.

JOHN R. BRADSHAW.